(12) United States Patent
Baus et al.

(10) Patent No.: US 9,491,110 B2
(45) Date of Patent: Nov. 8, 2016

(54) METHOD AND DEVICE FOR SECURING DATA PACKETS TO BE TRANSMITTED VIA AN INTERFACE

(75) Inventors: Michael Baus, Bietigheim-Bissingen (DE); Michael Stemmler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 13/695,810

(22) PCT Filed: Mar. 3, 2011

(86) PCT No.: PCT/EP2011/053207
§ 371 (c)(1),
(2), (4) Date: Feb. 8, 2013

(87) PCT Pub. No.: WO2011/138061
PCT Pub. Date: Nov. 10, 2011

(65) Prior Publication Data
US 2013/0136135 A1    May 30, 2013

(30) Foreign Application Priority Data
May 3, 2010 (DE) .................. 10 2010 028 485

(51) Int. Cl.
*H04L 12/801* (2013.01)
*H04L 1/00* (2006.01)

(52) U.S. Cl.
CPC ............ *H04L 47/34* (2013.01); *H04L 1/0061* (2013.01); *H04L 1/0083* (2013.01); *H04L 1/0084* (2013.01)

(58) Field of Classification Search
None
See application file for complete search history.

(56) References Cited

U.S. PATENT DOCUMENTS

| | | | |
|---|---|---|---|
| 4,970,714 A * | 11/1990 | Chen et al. ................. | 370/216 |
| 6,940,831 B1 * | 9/2005 | Omi et al. ................. | 370/310.1 |
| 2005/0033982 A1 * | 2/2005 | Paaske .................. | G06F 21/552 726/27 |
| 2005/0108465 A1 * | 5/2005 | Vogt .............................. | 711/100 |
| 2007/0242614 A1 * | 10/2007 | Buettner .............. | H04L 1/0032 370/248 |
| 2009/0077456 A1 * | 3/2009 | Pi ......................... | H03M 13/09 714/807 |
| 2009/0100320 A1 * | 4/2009 | Higgs et al. .................. | 714/807 |
| 2009/0313516 A1 * | 12/2009 | Shin ..................... | H04L 1/0003 714/748 |
| 2013/0121492 A1 * | 5/2013 | Vacon ................. | H04L 63/0492 380/270 |

FOREIGN PATENT DOCUMENTS

| | | |
|---|---|---|
| CN | 1969236 A | 5/2007 |
| DE | 10 2004 044 764 A1 | 3/2006 |
| DE | 10 2006 047 632 A1 | 4/2008 |
| JP | 5-103037 A | 4/1993 |
| JP | 6-21920 A | 1/1994 |
| JP | 2007-535850 A | 12/2007 |
| WO | 03/045000 A1 | 5/2003 |

OTHER PUBLICATIONS

International Search Report corresponding to PCT Application No. PCT/EP2011/053207, mailed Jul. 27, 2011 (German and English language document) (5 pages).

\* cited by examiner

*Primary Examiner* — Faruk Hamza
*Assistant Examiner* — Tito Pham
(74) *Attorney, Agent, or Firm* — Maginot, Moore & Beck LLP

(57) ABSTRACT

A method for securing data packets to be transmitted via an interface includes determining a check number over at least a portion of a first data packet and at least one portion of a second data packet. For this purpose, the first data packet is arranged according to a transfer protocol in a first data frame and the second data packet is arranged according to the transfer protocol in a second data frame.

13 Claims, 4 Drawing Sheets

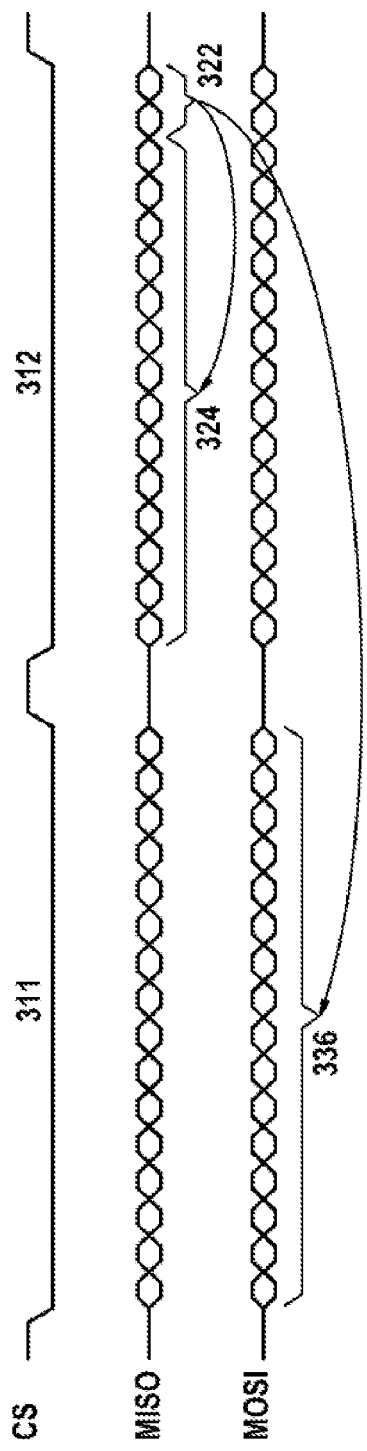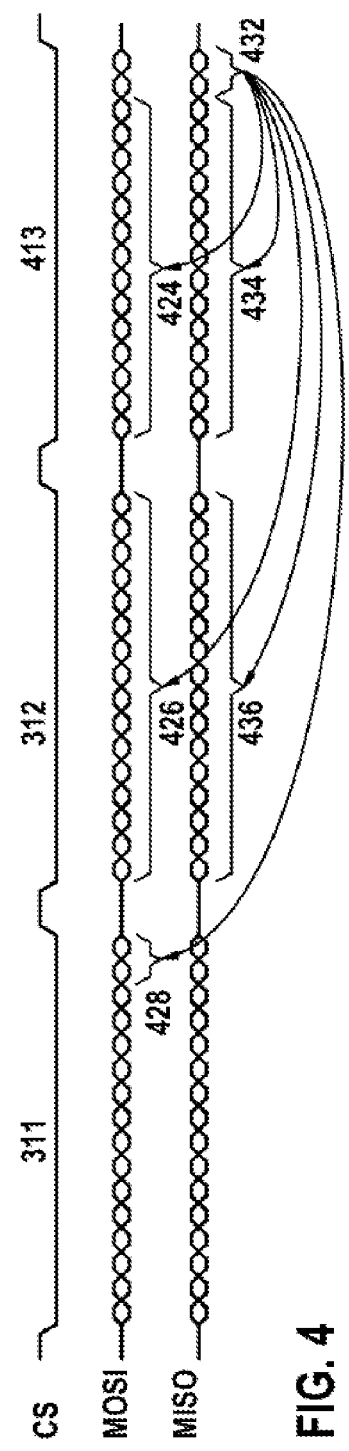

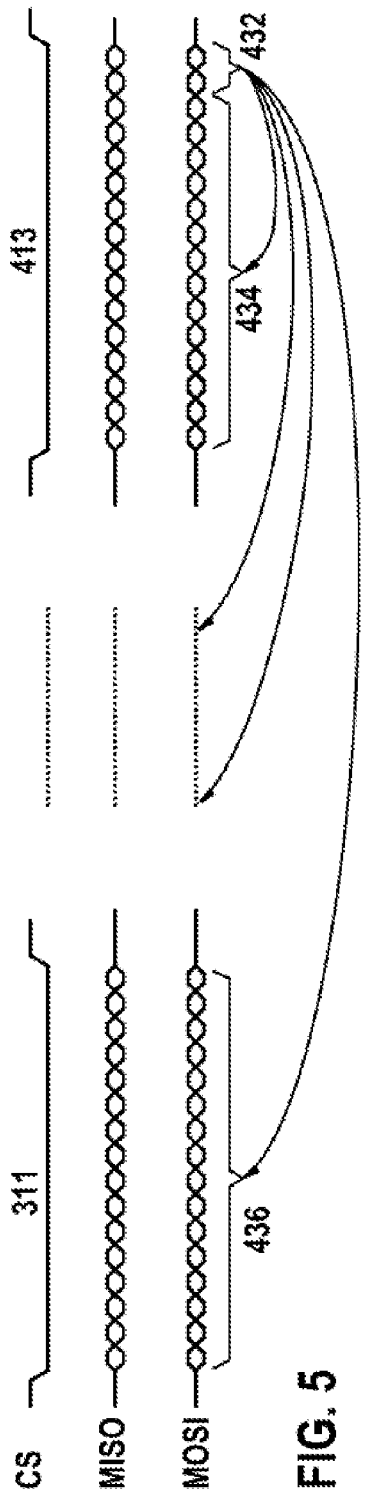
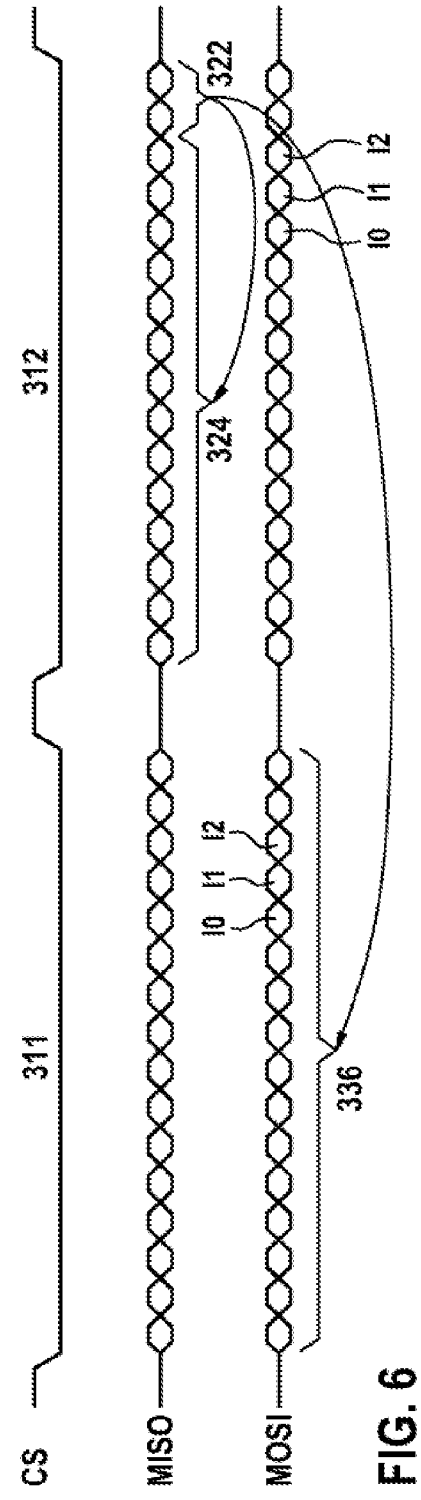

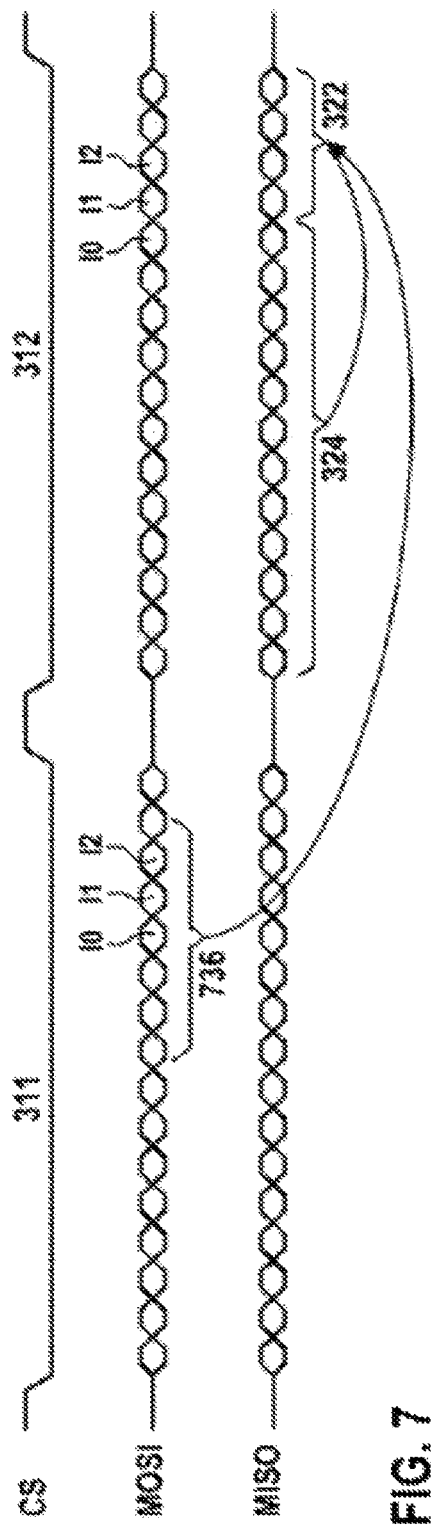
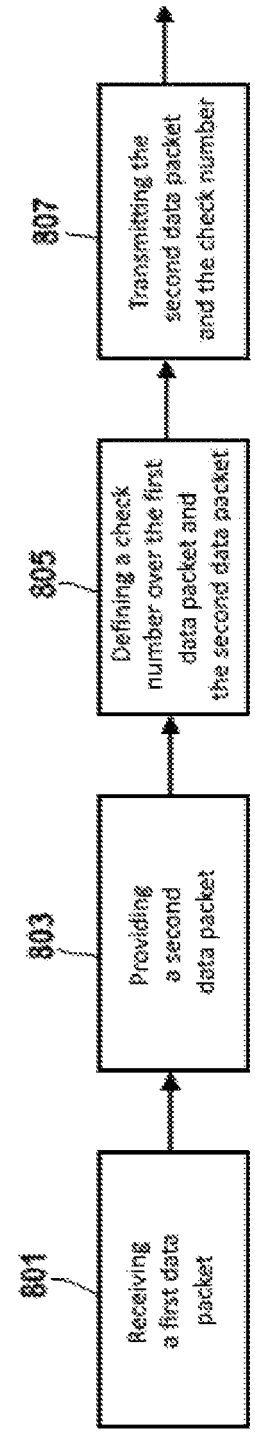
FIG. 7
FIG. 8

METHOD AND DEVICE FOR SECURING DATA PACKETS TO BE TRANSMITTED VIA AN INTERFACE

This application is a 25 U.S.C. §371 National Stage Application of PCT/EP2011/053207, filed On Mar. 3, 2011, which claims the benefit of priority to Serial No. DE 10 2010 028 485.8, filed on May 3, 2010 in Germany, the disclosures of which are incorporated herein by reference in their entirety.

BACKGROUND

The present disclosure relates to a method for securing data packets to be transmitted via an interface, a corresponding device and a corresponding computer program product.

DE 10 2006 047 632 A1 describes a method for processing a measurement value of an accident sensor. In the storage and transmission of data represented in binary form, individual bits can be corrupted through interferences. Check bits are attached to the data in order to detect errors of this type.

SUMMARY

Against this background, the present disclosure proposes a method for securing data packets to be transmitted via an interface, furthermore a device which uses this method, and finally a corresponding computer program product. Advantageous designs are derived from the following description.

The disclosure is based on the realization that, in sensors, the data which are transmitted from the slave to the master tend to be substantially more extensive than the data which must be transmitted from the master to the slave. Check numbers are data which represent no direct benefit, i.e., for example, sensor information. If the check number is also transmitted in each acknowledgement frame of the sensor (MISO), the portion of non-sensor data for the overhead formed by the checksum is increased.

If a defined relationship exists between the check number and the data to be checked therewith, no application-specific adaptations are possible. However, according to a transmission protocol according to the disclosure, it is not necessary for the bits of a data frame over which a checksum, for example a CRC (cyclic redundancy check), is calculated, to be permanently embedded in the protocol. If an application has a low security requirement, it is possible according to the disclosure to avoid having to calculate a check number for the previously defined data.

Known digital serial protocols (SPI) either have no check of the association of enquiry and acknowledgement (e.g. MM5 SPI), or specific bits must be retained in the acknowledgement which allocate the acknowledgement uniquely to the enquiry (OpenSPI32). From other protocols (e.g. CAN), the constructs of the message counters are known which are intended to indicate whether each enquiry has been answered with the correct acknowledgement and no enquiry/acknowledgement has been "overlooked". According to the disclosure, the large overhead in the acknowledgement, which occurs in the known constructs, can be avoided.

A reduction of the overload of the acknowledgement message is thus possible according to the disclosure without having to leave out security-related data. It is therefore possible to bypass the procedure of current protocols which provide data requested by the master, e.g. the sensor ID.

Advantages of the SPI design according to the disclosure consist in an optimization of the payload within the acknowledgment frame. An application-specific optimization of the coverage of the check number as security and of the payload ratio is possible without redesigning the protocol. An implementation of a check of an enquiry/acknowledgement pair without additional bits, known as a message counter, is possible. An implementation of an acknowledgement via an instruction code and address field offers additional security.

The present disclosure produces a method for securing data packets to be transmitted via an interface, wherein the method comprises the following steps: Determination of a check number over at least a portion of a first data packet and at least a portion of a second data packet, wherein the first data packet is arranged according to a transfer protocol in a first data frame and the second data packet is arranged according to the transfer protocol in a second data frame.

The interface may represent a data interface, via which information can be transmitted between a transmitter and a receiver. The transmitter and receiver can be digital components, for example a microcontroller and a sensor. The sensor can be disposed in a vehicle. The information to be transmitted can be transmitted in the form of data packets. The data packets can have a plurality of data bits. A transmission and reception of the data packets and a compilation of the data packets can be controlled via the transfer protocol. A data frame can define a time window specified by the transfer protocol, within which a data packet can be transmitted, a data packet can be received, or a data packet can be transmitted and a data packet can be received. Two consecutive data frames can be separated from one another by a time span. Alternatively, two consecutive data frames can also be directly adjacent to one another. Each data frame can be marked by one or more interface signals. The check number can be used to check an intactness of those data which are covered by the check number. Depending on the required security, corresponding known methods for determining the check number can be used. For example, the check number may enable a parity check or a cyclic redundancy check (CRC). The check number can have one or a plurality of data bits. Advantageously, the check number is formed over a plurality of data packets rather than over only one data packet, wherein the check number can also be formed over only partial areas of one or all data packets. With the aid of the check number, a receiver of the check number can check whether the data covered by the check number have been transmitted correctly via the interface.

The check number can be arranged together with the second data packet in the second data frame and can be transmitted together with the second data packet via the interface. In this way, the check of the portions of the first and second data packets which are covered by the check number can be started following a reception of the second data packet.

According to one embodiment, the first data packet and the second data packet can be transmitted via the interface. The check number can therefore be formed over two data packets to be transmitted. Alternatively, the first data packet can be received via the interface and the second data packet can be transmitted via the interface. The check number can therefore be formed over an already received data packet and a data packet to be transmitted. In this way, it is possible for a receiver of the second data packet, which had transmitted the first data packet, to recognize with the aid of the check number whether the first data packet has been correctly transferred.

In this case, the second data packet can be transmitted as an acknowledgement of the first data packet, and the first data packet can have identification data, wherein the portion of the first data packet over which the check number is determined comprises the identification data. An allocation between enquiry and acknowledgement can be carried out by means of the identification data.

However, the check number can be determined over the entire second data packet over only the portion of the first data packet. The portion of the first data packet represents a subset of an entire data quantity of the first data packet. The first data packet therefore has a further portion, over which the check number is not determined.

According to one embodiment, the check number can be determined in the determination step over further data packets which are transmitted via the interface in further data frames between the first data frame and the second data frame. In this way, the approach according to the disclosure can be extended to more than two data packets. The check number can be determined in each case over the entire further data packets or in each case over only a portion of the further data packets.

A number of the further data packets can be variable according to the transfer protocol. A transmission of the further data packets can be interrupted in response to an occurrence of a check event. The check number can be determined and the second data packet can be transmitted in response to the occurrence of the check event. The number of further data packets after which the so-called second data packet is transmitted with the check number can thus be defined via the check event. The check event can be triggered independently from the transfer protocol.

For example, the check event can be represented by a transmission of a predetermined data packet via the interface. The data packet can represent a specific enquiry which can be communicated via the interface or a further interface. Alternatively, the check event can also be transferred in advance and can contain information relating to the data over which the check number is to be determined.

The present disclosure furthermore provides a device which is designed to carry out or implement the steps of the method according to the disclosure in corresponding facilities. The underlying object of the disclosure can also be quickly and efficiently achieved by this design variant of the disclosure in the form of a device. The device can be implemented as a digital circuit.

A computer program product with program code which is stored on a machine-readable medium such as a semiconductor memory, a hard disk memory or an optical memory and which is used to carry out the method according to one of the embodiments described above, if the program is executed on a device, is also advantageous.

BRIEF DESCRIPTION OF THE DRAWINGS

The disclosure is explained in detail below by way of example with reference to the attached drawings, in which:

FIG. 3 shows a representation of secured data transmission, according to an example embodiment of the present disclosure;

FIG. 4 shows a representation of secured data transmission, according to a further example embodiment of the present disclosure;

FIG. 5 shows a representation of secured data transmission, according to a further example embodiment of the present disclosure;

FIG. 6 shows a representation of secured data transmission, according to a further example embodiment of the present disclosure;

FIG. 7 shows a representation of secured data transmission, according to a further example embodiment of the present disclosure;

FIG. 8 shows a flow diagram of a method, according to a further example embodiment of the present disclosure.

DETAILED DESCRIPTION

In the following description of preferred example embodiments of the present disclosure, the same or similar reference numbers are used for the elements represented in the various figures and acting in a similar manner, wherein a repeated description of these elements is omitted.

Figure 1:
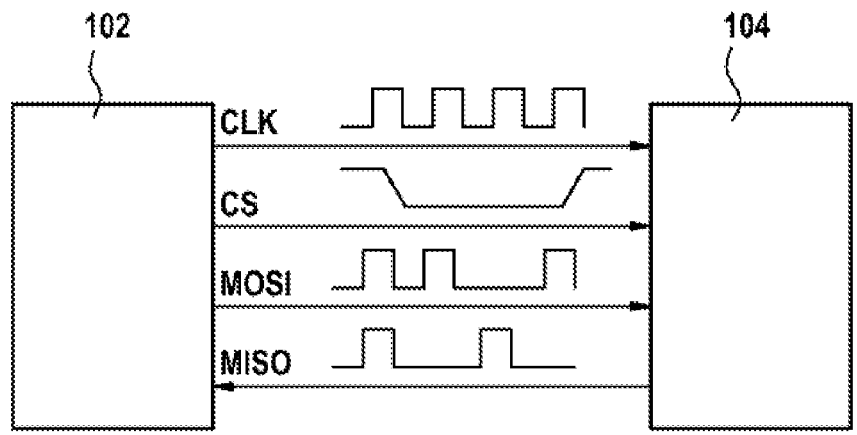
FIG. 1 shows a representation of an interface.

FIG. 1 shows a schematic representation of an SPI hardware interface between a master 102 and a slave 104. The master 102 can be implemented as a microcontroller (μC) and the slave 104 as a sensor. The interface has a clock line (CLK), a Chip Select (CS) line, a Master In Slave Out (MISO) line, and a Master Out Slave In (MOSI) line. The clock line (CLK) is designed to provide a clock signal and the Chip Select (CS) line is designed to provide a Chip Select signal from the master 102 to the slave 104. Data can be transmitted from the slave 104 to the master 102 via the Master In Slave Out (MISO) line, and data can be transmitted from the master 102 to the slave 104 via the Master Out Slave In (MOSI) line.

Figure 2:
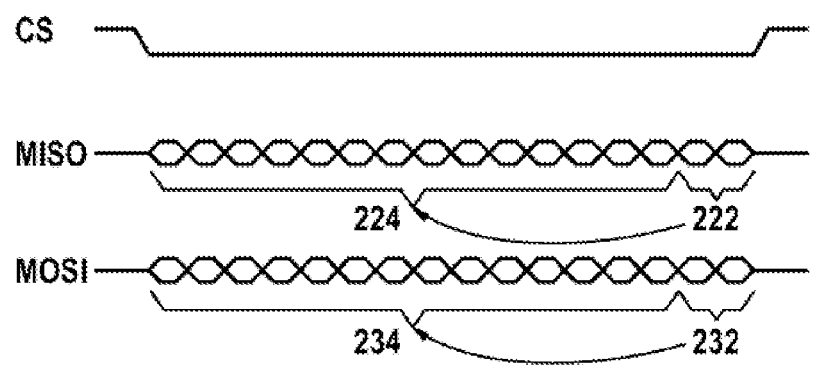
FIG. 2 shows a representation of a data transmission via an interface.

FIG. 2 shows an SPI frame in which an acknowledgement and an enquiry with their own checksum are transmitted within one frame. The SPI frame is defined by an active Chip Select (CS) signal. Within the frame, data are transmitted via the Master In Slave Out (MISO) line and the Master Out Slave In (MOSI) line. According to this example embodiment, 16 bits of data are in each case transmitted, wherein the last two bits of the data transmitted via the Master In Slave Out (MISO) line in each case form a check number 222 over the remaining data packet 224. According to this example embodiment, 16 bits of data are in each case transmitted, wherein the last two bits of the data transmitted via the Master Out Slave In (MOSI) line in each case form a check number 232 over the remaining data packet 234.

In the digital serial protocol (SPI), as shown in FIG. 1, one or more check numbers, for example a checksum, CRC or parity, are calculated for each frame individually and for both enquiry and acknowledgement, as shown in FIG. 2. Here, a frame designates a communication segment which is characterized in the case of SPI by the active phase of the Chip Select (CS).

According to the disclosure, a check number is not calculated over an individual frame, or even parts of an individual frame, but over a plurality of frames. Here, it is irrelevant whether the calculation is performed over one or more enquiry frames and/or one or more acknowledgement frames.

Different example embodiments of the present disclosure are shown in FIGS. 3 to 6. A common feature of the example embodiments is that a calculation of a check number is performed in each case over a plurality of communication segments.

According to the example embodiment shown in FIG. 3, a check number is formed over an acknowledgement frame and an enquiry frame.

A first data frame 311 and a second data frame 312 are shown, which are in each case characterized by an active Chip Select (CS). The frames 311, 312 are separated by a time span during which the Chip Select (CS) signal is inactive. The first frame 311 is located temporally in front of the second frame 312. Within the first frame 311, an acknowledgement data packet is transmitted via the Master In Slave Out (MISO) line, and an enquiry data packet is transmitted via the Master Out Slave In (MOSI) line. Within the second frame 312, an acknowledgement data packet is transmitted via the Master in Slave Out (MISO) line, and an enquiry data packet is transmitted via the Master Out Slave In (MOSI) line.

The acknowledgement data packet of the second frame 312 comprises a check number 322 which is formed over the remaining portion 324 of the acknowledgement data packet excluding the check number 322 and over a complete acknowledgement data packet 336 of the first frame 311. According to this example embodiment, the check number 322 comprises two bits and covers 14 bits of the remaining portion 324 of the acknowledgement data packet and 16 bits of the complete enquiry data packet 336. The check number 322 is then transmitted to the remaining portion 324 of the acknowledgement data packet.

According to the example embodiment shown in FIG. 4, a check number is formed over a plurality of acknowledgement frames and enquiry frames.

A first frame 311, a second frame 312 and a third frame 413 are shown, which are characterized in each case by an active Chip Select (CS). The frames 311, 312, 413 are separated by a time span during which the Chip Select (CS) signal is inactive. The first frame 311 is located temporally in front of the second frame 312, and the second frame 312 is located temporally in front of the third frame 413. Within the frames 311, 312, 413, an acknowledgement data packet is transmitted in each case via the Master In Slave Out (MISO) line and an enquiry data packet is transmitted in each case via the Master Out Slave In (MOSI) line.

The acknowledgement data packet of the third frame 413 comprises a check number 432 which is formed over the remaining portion 434 of the acknowledgement data packet of the third frame 413 excluding the check number 432, over a portion 424 of the enquiry data packet 424 of the third frame 413, over a complete acknowledgement data packet 436 of the second frame 312, over a complete acknowledgement data packet 426 of the second frame 312 and over a portion 428 of the enquiry data packet 428 of the first frame 411. The check number could also be formed over further data packets.

A plurality of ideas are combined in FIG. 4.

On the one hand, the check number or CRC is combined over the data 428, 426, 436, 424, 434 in the packet 432. However, the master must then always indicate the range within which the CRC is to be combined. For example, the master can notify the slave in a message that a following checksum is to be calculated over a specific number, a specific type and/or a specific portion of data packets. Alternatively, a unique sequence pattern can exist which defines the data packets over which the check number is formed.

Furthermore, insofar as the check number or CRC is combined over a wide range, it is not necessary for the check number also to be transmitted in each frame. A procedure of this type is shown in FIG. 4. This is appropriate in particular if the CRC has a length of n*8 bit, since current SPI drivers operate in this pattern.

Furthermore, it is not necessary for the check number also to be formed over the currently transferred packets 424, 434.

According to the embodiment shown in FIG. 5, a check number is formed over an indefinite number of acknowledgement frames.

A first frame 311 and a third frame 413 are shown, between which a plurality of further frames can be arranged. The frames 311, 413 are characterized in each case by an active Chip Select (CS). Within the frames 311, 413, an acknowledgement data packet is transmitted in each case via the Master In Slave Out (MISO) line and an enquiry data packet is transmitted in each case via the Master Out Slave In (MOSI) line.

The enquiry data packet of the third frame 413 comprises a check number 432 which is formed over the remaining portion 434 of the enquiry data packet of the third frame 413 excluding the check number 432, over a complete enquiry data packet 436 of the first frame 312, and over complete enquiry data packets of the further frames.

FIG. 5 represents a concept according to the disclosure in which the checksum 432 is calculated over a number of frames not previously defined. The checksum is formed over all, or a specific part, of the previously communicated bits which represent information only with a specific enquiry or in the case of a specific configuration.

The calculation of the checksum can be carried out in the slave or sensor. The latter can carry out the operation and include a corresponding communication in the checksum calculation until the master transmits a specific command, which can also be transmitted via the bus, to the sensor. The specific command could, for example, also be a hardware pin, via which the command is signaled.

The command does not have to be information which is transferred a small number of times, but could also be a bit which is also transmitted by default in the protocol and carries only the information indicating whether the checksum is extended by the current communication or is concluded with the current communication.

Thus, the specific enquiry can be a signaling via a hardware pin, an individual bit in the header of each message or an individual message from the master. In this way, the master can control the calculation of the checksum or the interruption of the calculation.

According to the example embodiment shown in FIG. 6, a check number is formed over an enquiry and acknowledgement. The enquiry contains specific bits for identifying the connection between the enquiry and the acknowledgement.

The example embodiment shown in FIG. 6 corresponds to the example embodiment shown in FIG. 3, wherein the enquiry data packet 336 shown in FIG. 6 has identification bits which enable the acknowledgement data packet 324 to be allocated to the enquiry data packet 336. According to this example embodiment, three identification bits I0, I1, I2 are provided. The check number 322 includes the identification bits.

FIG. 6 represents an extension of the enquiry with freely selectable identification bits, for example the 3 bits 10 to 12. If the check number 322 in the acknowledgement frame is calculated over both the acknowledgement and the enquiry, including the identification bits, it can be ensured that the acknowledgement is associated with the enquiry since the check number of the acknowledgement would not otherwise be correct. Through variation of the identification bits, a plurality of successive identical enquiries and/or acknowledgements can be differentiated in that the identification bits are varied from enquiry to enquiry and the check number therefore differs also.

In the theoretical case, for which the probability is very low, there could be two combinations of communication messages which produce the same check number. However, this probability is the probability in principle of an incorrect checksum. With a longer checksum, this probability of occurrence is reduced, exactly as it is lowered with an increasing number of data to be secured. For example, in the case of a checksum with a bit length of 1 or 2, the probability that two correspondingly long messages will produce the same checksum is high. For this reason, inter alia, it should be ensured that too many data are never included into a constant-length checksum. Accordingly, it should be ensured that the length of the checksum meets the security requirements. According to the disclosure, known calculation rules (polynomials) for checksums and the ratio of the lengths of the data to be secured and the checksums can be used.

According to the example embodiment shown in FIG. 7, a check number is formed over an enquiry and acknowledgement. The enquiry contains specific bits to be secured of a connection between the enquiry and the acknowledgement or the enquiry and the content of the acknowledgement.

A first frame 311 and a second frame 312 are shown, which are characterized in each case by an active Chip Select (CS). The frames 311, 312 are separated by a time span during which the Chip Select (CS) signal is inactive. The first frame 311 is temporally in front of the second frame 312. Within the first frame 311, an acknowledgement data packet is transmitted via the Master In Slave Out (MISO) line and an enquiry data packet is transmitted via the Master Out Slave In (MOSI) line. Within the second frame 312, an acknowledgement data packet is transmitted via the Master In Slave Out (MISO) line and an enquiry data packet is transmitted via the Master Out Slave In (MOSI) line.

The acknowledgement data packet of the second frame 312 comprises a check number 322, which is formed over the remaining portion 324 of the acknowledgement data packet excluding the checksum 322 and over a portion 736 of an enquiry data packet of the first frame 311. According to this example embodiment, the check number 322 comprises four bits and covers 12 bits of the remaining portion 324 of the acknowledgement data packet and 7 bits of the enquiry data packet. The check number 322 is transmitted following the remaining portion 324 of the acknowledgement data packet. According to this example embodiment, the enquiry data packet has three bits I0, I1, I2 which characterize the connection between the enquiry and the acknowledgement or the enquiry and the content of the acknowledgement. The bits I0, I1, I2 are arranged in the portion 736 of the enquiry data packet over which the check number 322 is formed.

The example embodiment shown in FIG. 7 is based on the idea according to the disclosure that the check number is not calculated over an individual acknowledgement frame, but is calculated over parts of the enquiry and the acknowledgement.

The concept shown in FIG. 7 represents an extension of the enquiry with freely selectable bits. If the check number 322 in the acknowledgement frame is calculated over both the acknowledgement and parts of the enquiry, it can be ensured that the acknowledgement is associated with the enquiry since the check number of the acknowledgement would not otherwise be correct. Through variation of the identification bits, a plurality of successive identical enquiries and/or acknowledgements can be differentiated in that the identification bits are varied from enquiry to enquiry and the check number therefore differs also.

Furthermore, it can be guaranteed with this concept that e.g. the instruction code and/or the address to be read or written can also be transmitted indirectly via the CRC of the slave. This means that the enquiry bits of the master and all other bits, not only the ID bits for this discrete enquiry, can also be secured in the common checksum. This is an advantage for the current protocols (MM5 SPI), in which the instruction code of the address is not also transmitted in the acknowledgement.

If, in the example embodiments shown, the check of the check number takes place in the sensor or generally in the slave, the result of the check has still to be communicated to the master. This can be done, for example, using a status bit.

The example embodiments shown are merely selected as examples, wherein alternatives and generalizations are possible.

For example, the concept of the multi-frame checksum calculation can also be used in protocols other than those shown. Known examples in which the concept according to the disclosure can be implemented are, for example, CAN or PSI5. Both one-way and two-way protocols can be involved.

Instead of a check number over everything, one or more check numbers could also be calculated over individual segments or a plurality of segments of one or more frames.

Bits which do not have to be secured can be removed from the check number calculation.

Data not to be secured may be data which do not have to meet the security requirements of the data to be secured, but have to meet less stringent security requirements. This may be the case, for example, if the data in a vehicle cannot lead to a safety-critical behavior.

An example of data not to be secured could be environmental data which are transferred to the sensor and which the sensor also stores with a fault memory entry. The fault memory entry may be helpful in a subsequent analysis, e.g. in a diagnosis, but has no impact on a specific system behavior.

For other applications, the proposed principle can of course also be used to optimize the payload of the master.

FIG. 8 shows a flow diagram of a method for securing data packets to be transmitted via an interface, according to one example embodiment of the present disclosure.

In a step 801, a first data packet can be received by a first communication facility which is, for example, part of a sensor. The first data packet can represent an enquiry which is transmitted from a second communication facility which is, for example, part of a control device or microcontroller, to the first communication facility. In a step 803, the first communication facility can be designed to provide a second data packet for transmission to the second communication facility. The second data packet can represent an acknowledgement which the second communication facility provides as a response to the enquiry of the first communication facility. In a step 805, the first communication facility can be designed to define a check number over the first data packet and the second data packet. The check number can be attached to the second data packet as additional information, which means that the second data packet can be extended with the check number. Alternatively, the first communication facility can be designed to define the check number over only a subset of the first data packet and a subset of the second data packet, over a subset of the first data packet and the complete second data packet or over the complete first data packet and a subset of the second data packet. In a step 807, the second data packet extended with the check number can be transmitted by the first communication facility. The second communication facility can be designed to receive the second data packet, to extract the check number from the second data packet and evaluate it. To do this, the second communication facility can be designed to define the check number from stored data of the first data packet and the received data of the second data packet and to compare it with the check number received via the second data packet. If the check numbers match, it can be assumed that both the first data packet and the second data packet have been transmitted without errors between the first and second communication facilities. The check number can be defined in the first and second communication facilities in each case by means of the same algorithm.

The steps described can be varied according to the example embodiments shown in the preceding figures.

The example embodiments described and shown in the figures are selected as examples. Different example embodiments can be combined with one another completely or in relation to individual features. One example embodiment can also be supplemented with features of a further example embodiment. Furthermore, method steps according to the disclosure can be repeated and carried out in a sequence other than that described. If an example embodiment comprises an "and/or" operation between a first feature and a second feature, this can be read in such a way that the example embodiment according to one embodiment has both the first feature and the second feature and, according to a further embodiment, has either only the first feature or only the second feature.

The concept according to the disclosure of a multi-frame SPI checksum or a multi-data SPI checksum can be used, for example, in communication protocols of sensors used in vehicles.

The invention claimed is:

1. A method for securing data packets to be received and transmitted via an interface, comprising:
    identifying at least one bit of a first data packet, the first data packet being either received via the interface or to be transferred via the interface at a first time according to a transfer protocol;
    identifying at least one bit of a second data packet to be transmitted via the interface at a second time according to the transfer protocol;
    calculating a check number using the at least one bit of the first data packet and the at least one bit of the second data packet;
    transmitting the check number via the interface;
    transmitting with the interface a plurality of data packets after receiving the first data packet and prior to transmitting the second data packet;
    determining the check number with reference to the plurality of data packets;
    interrupting transmission of data packets in the plurality of data packets in response to a check event;
    determining the check number with reference to data packets in the plurality of data packets transmitted prior to the check event; and
    transmitting with the interface the check number and the second data packet in response to the check event.

2. The method as claimed in claim 1 the transmission of the check number further comprising:
    transmitting with the interface the check number in association with the second data packet.

3. The method as claimed in claim 2,
    wherein the first data packet includes identification bits for indicating an association between the first and the second packets,
    wherein the at least one bit of the first data packet includes the identification bits.

4. The method as claimed in claim 1, the determination of the check number further comprising:
    determining the check number over an entirety of the second data packet and only a portion of the first data packet.

5. The method as claimed in claim 1 further comprising:
    receiving with the interface a predefined data packet; and
    identifying the check event with reference to the predefined data packet.

6. The method of claim 1, wherein the check number is attached to the second data packet as additional information, and
    wherein the second data packet with the added check number is transmitted via the interface.

7. The method of claim 6, further comprising:
    transmitting the first data packet and the second data packet to a receiver;
    determining a received check number using the at least one bit of the first data packet and the at least one bit of the second data packet at the receiver;
    comparing the received check number determined at the receiver with the check number added to the second data packet; and
    determining whether the first and second data packets were transmitted without errors based on the comparison.

8. The method of claim 7, further comprising:
    prior to identifying the at least one bit of the first data packet, receiving the first data packet via the interface at a first digital device at the first time,
    wherein the first data packet was transmitted to the first digital device from a second digital device, and
    wherein the second data packet is transmitted via the interface at the second time with the check number to the second digital device.

9. A method for securing data packets to be received and transmitted via an interface, comprising:
    identifying at least one bit of a first data packet, the first data packet being either received via the interface or to be transferred via the interface at a first time according to a transfer protocol and a portion of the first data packet including an instruction code;
    identifying at least one bit of a second data packet to be transmitted via the interface at a second time according to the transfer protocol;
    transmitting with the interface a plurality of data packets after receiving the first data packet and prior to transmitting the second data packet;
    interrupting transmission of data packets in the plurality of data packets in response to a check event;
    determining a check number with reference to data packets in the plurality of data packets transmitted prior to the check event; and
    transmitting with the interface the check number and the second data packet in response to the check event.

10. The method as claimed in claim 9 the transmission of the check number further comprising:
    transmitting with the interface the check number in association with the second data packet.

11. The method as claimed in claim 10, wherein the first data packet includes identification bits for indicating an association between the first and the second packets,
    wherein the at least one bit of the first data packet includes the identification bits.

12. The method as claimed in claim 9, the determination of the check number further comprising:
  determining the check number over an entirety of the second data packet and only a portion of the first data packet.

13. The method as claimed in claim 9 further comprising:
  receiving with the interface a predefined data packet; and
  identifying the check event with reference to the predefined data packet.

* * * * *